PHONOGRAPH-RECORD CARRIER

Filed Jan. 22, 1964 2 Sheets-Sheet 1

INVENTORS.
WILLIAM V. BUCHANAN
RICHARD D. MUIR

BY Percy Freeman

ATTORNEY.

ATTORNEY.
WILLIAM V. BUCHANAN
RICHARD MUIR
BY
Percy Freeman
ATTORNEY

United States Patent Office 3,224,655
Patented Dec. 21, 1965

3,224,655
PHONOGRAPH-RECORD CARRIER
William V. Buchanan and Richard D. Muir, both of New York, N.Y., assignors to Command Mfg. Co., Inc., New York, N.Y., a corporation of New York
Filed Jan. 22, 1964, Ser. No. 339,404
4 Claims. (Cl. 224—48)

This invention relates generally to carrying devices, and is especially concerned with a unique and highly improved carrying device for phonograph records.

As is well known, the safe and easy portability of phonograph records presents substantial problems, and often results in damage to or breakage of the carried records.

Accordingly, it is an important object of the present invention to provide a phonograph-record carrier which overcomes the above-mentioned problems, renders portability of phonograph records in substantial numbers both safe to the records and user, convenient and easy in transit, as well as in loading and unloading of the records with respect to the carrier.

It is a further object of the present invention to provide a phonograph-record carrier having the advantageous characteristics mentioned in the preceding paragraph which is extremely simple in construction, foolproof and reliable in operation, durable throughout a long useful life, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figures 1, 2, 3, 4, 5, 6, 7, 8, 9, 10, 11, 12, 13, 15:
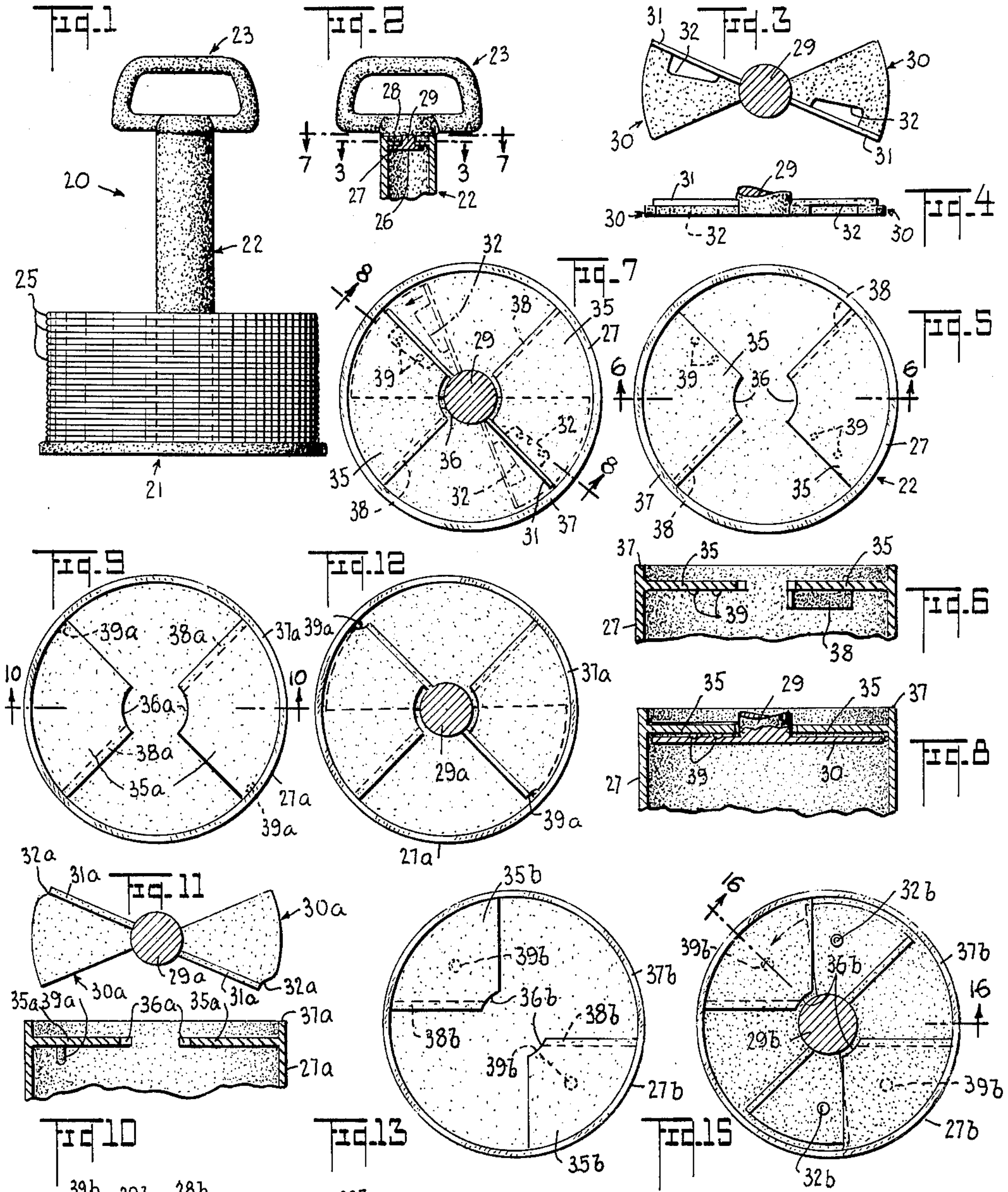
FIGURE 1 is an elevational view showing a phonograph-record carrier of the present invention having a stack of records in operative association therewith.
FIGURE 2 is a fragmentary elevational view of the instant record carrier, partly in section for clarity of understanding.
FIGURE 3 is a horizontal sectional view taken generally along the line 3—3, greatly enlarged, and showing only the handle unit, as removed from the post.
FIGURE 4 is an elevational view of the structure of FIGURE 3.
FIGURE 5 is a top plan view of the post of FIGURES 1 and 2 with the handle unit removed.
FIGURE 6 is a sectional elevational view taken generally along the line 6—6 of FIGURE 5.
FIGURE 7 is a horizontal sectional view taken generally along the line 7—7 of FIGURE 2, greatly enlarged, and illustrating alternate positions of the handle unit relative to the post.
FIGURE 8 is a partial sectional elevational view taken generally along the line 8—8 of FIGURE 7.
FIGURE 9 is a top view similar to FIGURE 5 but showing a slightly modified embodiment of the instant invention.
FIGURE 10 is a fragmentary sectional elevational view taken generally along the line 10—10 of FIGURE 9.
FIGURE 11 is a horizontal sectional view similar to FIGURE 3 but slightly modified for association with the embodiment of FIGURES 9 and 10.
FIGURE 12 is a horizontal sectional view similar to FIGURE 8, but of the embodiment of FIGURES 9–11.
FIGURE 13 is a top view similar to FIGURE 5 but showing still another embodiment of the present invention.
FIGURE 15 is a horizontal sectional view similar to FIGURE 7, but of the embodiment of FIGURES 13 and 14.

Referring now more particularly to the drawings, and specifically to FIGURES 1–8 thereof, a phonograph-record carrier is there shown in FIGURE 1 and generally designated 20. The carrier includes a base or support 21, which may be a generally flat disc or other suitable configuration. Upstanding from the base or support 21, preferably centrally thereof is a standard or post 22. If desired, the post 22 may be of tubular or hollow construction, and may be formed integral with the base 21, as by molding of plastic, or otherwise fixed to the base. At the upper end of the post 22 is a retainer unit or handle 23.

Resting on the base 21 is a stack of phonograph records 25. The records 25 are circumposed about the post 22; or, viewed otherwise, the post engages upward through the records 25. As the handle 23 extends laterally beyond post 22, the records 25 are positively retained in position about the post. The handle 23 may advantageously be of a closed, loop configuration, preferably symmetrical with respect to and extending transversely of the post.

In order to remove the records 25 from the post 22, the handle 23 must first be removed. Toward this end suitable detachable connection means is provided, see FIGURE 2, removably securing the handle to the post. As the post 22 may be tubular, the upper end thereof is open and defines a socket or receiver 27. The lower central region of handle 23 may be formed with a generally flat, disc-shaped part 28 adapted to seat on and close the upper socket-defining region 27 of the post 22.

Depending from the underside of handle part 28 centrally into the socket 27 is a pin or plug 29. The pin or plug 29 is best shown in FIGURES 3 and 4, where it will be seen that a pair of diametrically opposed external projections 30 extend radially outward from the lower or distal end of the plug. The projections 30 are each of generally sector-shaped configuration and lie in a plane normal to the plug. Further, along one radial edge or side of each projection 30 there is provided an upstanding rib or stop lip 31. The stop lips or ribs 31 of the projections 30 extend radially outward from the plug 29 in generally opposite directions and extend above their associated projections 30. In addition, each of the projections 30 may be cut away, as at 32 at a location medially of the stop lips 31 and extending inward therebeyond to define openings through the respective projections.

Internally within the upwardly facing socket 27 of post 22, see FIGURES 5 and 6, there are provided a pair of diametrically opposed radially inwardly extending projections 35. The projections 35 may each be of generally sector-like configuration, extending radially inwardly from opposite wall portions of socket 27 and terminating in arcuately concave edges 36 short of the central socket region. In FIGURE 6, it will be observed that the projections 35 are generally flat, substantially coplanar with each other and located in a plane adjacent to and spaced below the upper end edge 37 of the socket 27. Along one radial edge or side of each internal projection 35 there may be formed a depending stop rib or lip 38, while adjacent to the other radial edge of each projection 35, there may be formed on the underside thereof one or more protuberances or detents 39. The internal projections 35 may be formed integrally with the socket portion 27 of post 22; and, the plug 29 and its external projections 30 may be formed integrally with the handle 23.

In the assembled condition, see FIGURES 7 and 8, the handle part 28 is seated on the upper end 37 of the socket 27, with the plug 29 extending downward between the inner edges 36 of the projections 35 and therebeyond. The external projections 30, therefore, lie in a plane below that of the internal projections 35. In this condition, the handle 23 may be rotated relative to the post 22 to move the external projections 30 to underlie the internal projections 35, as shown in dashed lines in FIGURE 7. To assume this position, the projections 30 have ridden beneath the detents 39 until the detents are located in the cutouts 32. The various parts are of sufficient resiliency such that the projections 30 ride across and in engagement with the detents 39 until the latter snap into the cutouts 32. In this condition, further rotation of plug 29 is limited by engagement of stop ribs 31 with respective projections 35; and, this condition is effectively self-retaining in the absence of a deliberate turning action of the handle 23 relative to the post 22.

The handle 23 is thereby connected to the post 22 for retaining the records 25 on the post and permitting of manual portability of the entire assemblage. When removal of the records 25 is desired, it is only necessary to rotate the handle 23 relative to the post 22, in the clockwise direction, as seen in FIGURE 7, against the holding action of the detents 39, to locate the projections 30 between the projections 35 for free upward withdrawal of the entire handle unit and disconnection thereof from the post 22.

In the embodiment of FIGURES 9–12, the socket **27*a* is provided with internal projections 35*a* similar to the internal projections 35 but without the detents 39. However, an internal protuberance or detent 39*a* is provided on the inner wall of socket 27*a* beneath each projection 35*a***.

The pin or plug **29*a* is provided on its lower, distal end with a pair of external projections 30*a* which are essentially similar to the external projections 30. However, the projections 30*a* may be formed without the cutout 32 but are provided with notches or cutouts 32*a* each at one distal corner of a respective projection. In the assembled condition of FIGURE 12 the plug 29*a* depends centrally into the socket 27*a*, and the projections 30*a* underlie respective projections 35*a*. It will there be noted that each detent or protuberance 39*a* is engaged in a respective cutout or notch 32*a* to resist inadvertent or accidental rotation of projections 30*a* out of their underlying relation with respect to projections 35*a*. However, upon deliberate clockwise rotation of plug 29*a*, by the inherent resilience of the structure, the radially outer edges of projections 30*a* will ride over their respective adjacent detents 39*a* until the projections 30*a* are located between projections 35*a* for withdrawal of plug 29*a* from socket 27*a*. Of course, return to the secured condition of FIGURE 12 may be obtained by forcible rotation of the projections 30*a* counterclockwise beneath respective projections 35*a*, riding across respective detents 39*a* until the latter snap into cutouts 32*a***.

In the embodiment of FIGURES 13–16 a socket **27*b* is provided with internal projections 35*b* which are substantially similar to the projections 35 and 35*a*. However, both the detents 39 and 39*a* are absent, and a depending protuberance or detent 39*b* is provided centrally on the underside of each projection 35*b***.

The depending pin or plug **29*b* is provided with external projections 30*b* which may be essentially similar to the projections 30 and 30*a*, but without the cutouts 32 or 32*a*. Rather, the projections 30*b* are each provided centrally thereof on the upper surface with a recess or dimple 32*b* for mating reception with respective detents 39*b***.

Figures 14, 16:
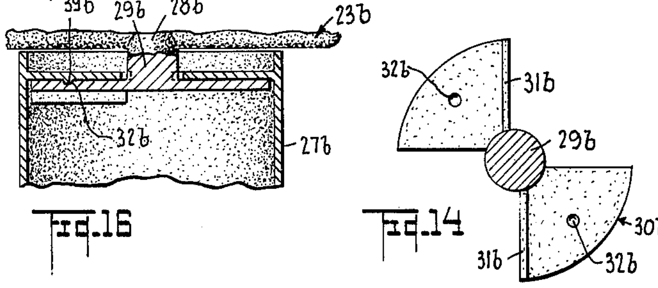
FIGURE 14 is a horizontal sectional view similar to FIGURE 3 for use in conjunction with the embodiment of FIGURE 13.
FIGURE 16 is a partial sectional elevational view taken generally along the line 16—16 of FIGURE 15.
Figure 17:
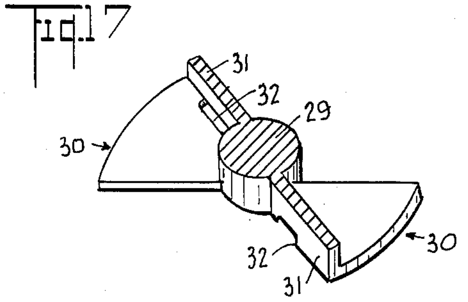
FIGURE 17 is a perspective view of the part shown in FIG. 3.
Figure 21:
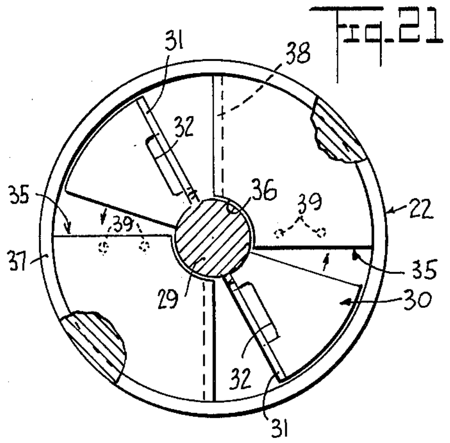
FIGURE 21 is a horizontal view partly in section, as viewed along line 7—7 of FIG. 2, but drawn to a much enlarged scale, and illustrating the position of the external projections on the handle plug relative to the inwardly extending projections fixed in the post, prior to the projections being interlocked.
Figure 18:
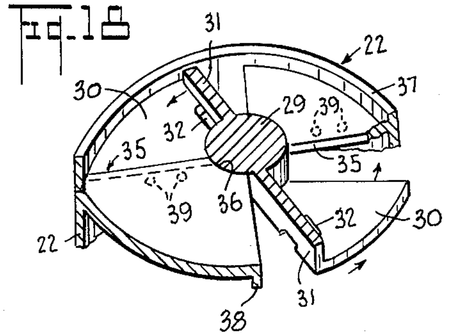
FIGURE 18 is a fragmentary perspective sectional view similar to the section shown in FIG. 7, but to a greatly enlarged scale, illustrating the relationship of the handle unit relative to the post unit, showing the parts in initial position prior to being interengaged.
Figure 19:
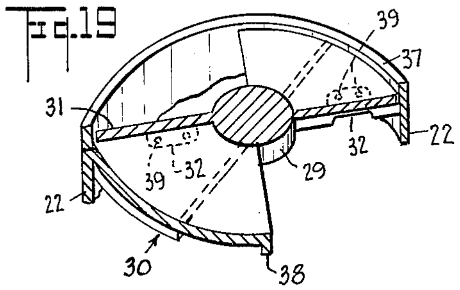
FIGURE 19 is a similar view to that shown in FIG. 18, but illustrating the parts in the interlocked position.
Figure 22:
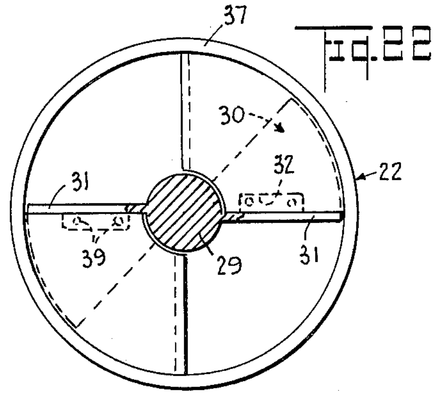
FIGURE 22 is similar to FIG. 21, but showing the respective projections in interlocked position.
Figure 20:
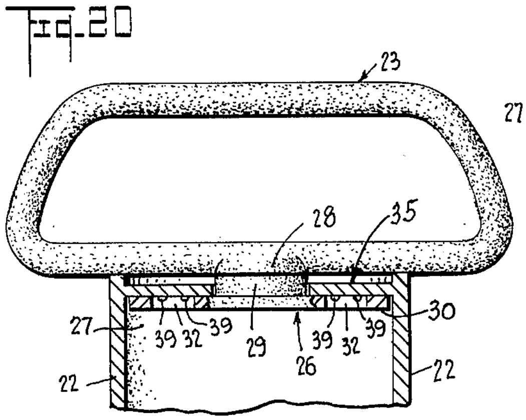
FIGURE 20 is a fragmentary elevational view partly in section showing the interlocking means disclosed in FIG. 2, but drawn to an enlarged scale.
Figure 23:
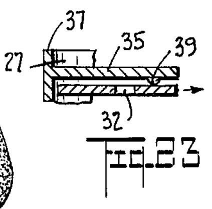
FIGURE 23 is a fragmentary sectional view showing the interengaging projections before final engagement, and indicating the protuberance relative to the corresponding opening in the other projection.
Figure 24:
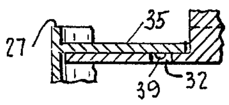
FIGURE 24 is a view similar to FIG. 23, but showing the projections in interlocked relation with a protuberance entered into the opening.

In the assembled condition of FIGURES 15 and 16, the plug **29*b* is rotatable to engage the projections 30*b* beneath respective projections 35*b*, the detents 39*b* riding on the projections 30*b* and snapping into respective dimples 32*b*. This interengagement of detents 39*b* and dimples 32*b* effectively retains the projections 30*b* beneath the projections 35*b* for handling of the assemblage, while permitting detachment by rotation of the plug 29*b* to locate the projections 30*b* between projections 35*b*** for upward withdrawal and detachment of the handle unit from the post.

From the foregoing, it is seen that the present invention provides a phonograph-record carrier construction which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A phonograph-record carrier comprising a support for supporting a stack of records, a post upstanding from said support for engagement through said records, a handle on an upper region of said post and projecting laterally therebeyond for retaining said records on said post, and holding means removably holding said handle in position on said post, said holding means comprising a detachable connection means between said handle and post, said detachable connection means comprising a plug projecting from one of said handle and post, the other of said handle and post being provided with a socket rotatably receiving said plug, internal lateral projections in said socket extending toward an intermediate region of said plug, external lateral projections on the distal region of said plug, said projections being configured for relative rotation into and out of overlying relation for detachably connecting said handle to said post.

2. A phonograph-record carrier according to claim 1, in combination with resilient detent means releasably retaining said projections in said overlying relation, and comprising interfitting formations on facing surfaces of said projections when the latter are in said overlying relation, and stop means on at least one of said projections engageable with the other projection for limiting relative movement thereof into said overlying relation.

3. A phonograph-record carrier according to claim 1, said internal and external projections being of generally sector-shaped configuration and respectively terminating short of said plug and socket, and an internal detent in said socket, said external projection having its terminal edge adapted to ride over said detent for releasably retaining said projections in said overlying relation.

4. A phonograph-record carrier comprising a base for supporting a stack of records, a post upstanding from said base for engagement through the supported records, a carrying handle at the upper end of said post, said post being provided at its upper end with an upwardly facing socket, a plurality of internal projections extending radially into said socket and terminating short of the central socket region, a plug projecting from said handle removably into said socket centrally thereof between and beyond said internal projection, and a plurality of spaced external projections extending radially outward the distal region of said plug underlying said internal projections to retain said plug in said socket, said plug being rotatable to locate said external projections between said internal projections for removing said plug from said socket.

References Cited by the Examiner

UNITED STATES PATENTS

| | | | |
|---|---|---|---|
| 2,688,490 | 9/1954 | Schumaker | 211—40 |
| 2,859,710 | 11/1958 | Elsner | 24—221 |
| 2,931,471 | 4/1960 | Howard | 24—221 |
| 2,954,898 | 10/1960 | Freeberg | 224—45 |
| 3,015,870 | 1/1962 | Ely | 24—221.2 |

GERALD M. FORLENZA, *Primary Examiner.*

HUGO O. SCHULZ, *Examiner.*